Oct. 29, 1935.          H. F. WEISS          2,019,241
AIR CLEANER FOR GAS ENGINE INTAKES
Filed Aug. 15, 1933          2 Sheets-Sheet 1

INVENTOR
H. F. Weiss.
BY
Pennie, Davis, Marvin & Edmonds
ATTORNEYS

Oct. 29, 1935.  H. F. WEISS  2,019,241
AIR CLEANER FOR GAS ENGINE INTAKES
Filed Aug. 15, 1933  2 Sheets-Sheet 2

INVENTOR
H. F. Weiss
BY
Pennie, Davis, Marvin & Edmonds
ATTORNEYS

Patented Oct. 29, 1935

2,019,241

UNITED STATES PATENT OFFICE 2,019,241

AIR CLEANER FOR GAS ENGINE INTAKES

Howard F. Weiss, Madison, Wis., assignor to C. F. Burgess Laboratories, Inc., Madison, Wis., a corporation of Delaware Application August 15, 1933, Serial No. 685,159

8 Claims. (Cl. 183—45)

This invention relates to an air filtering medium, particularly to a filtering mass to be used as an air cleaner for an automobile carburetor. It also relates to a filtering unit for such use.

It is an object of the invention to provide a filtering mass which possesses high filtering efficiency without offering excessive resistance to the flow of air therethrough.

It is a further object of the invention to provide a filtering mass which maintains its high efficiency throughout a long period of usefulness.

It is a further object of the invention to provide an efficient filtering mass which is light in weight and inexpensive and which is adapted to be adjusted to meet different service conditions with uniform effectiveness.

The filtering medium of this invention comprises a gas pervious mass of matted, intertangled, elongated strands providing among them a labyrinth or maze of interstices through which the air or gas to be filtered is conducted. The filtering materials of this general character which have been used heretofore possess various disadvantages, such as low filtering efficiency, rapid decrease in filtering efficiency after short periods of use, increased cost, uneven matting down with use to provide open channels with no filtering effect and breakage of the fibers, with the passage of fragments into the motor.

This invention provides a filtering mass which is relatively inexpensive and is substantially free of most of the disadvantages mentioned. The elongated strands of this invention are formed from billets of wood. They are cut by means of knives which move longitudinally of the wood billets, substantially parallel to the grain, and produce relatively flat-sided strands, angular in cross-section. The knives do not perform a smooth cutting operation but act somewhat as advancing wedges with the result that the strands are partially cut and partially torn from the wood. The surfaces of the strands are consequently rough and irregular, and numerous pores are exposed therein. They can be produced at substantially less cost than can steel wool, wire or other metal strands, hair felt and the other filtering materials known and used heretofore.

As will be explained hereinafter, such strands possess desirable properties which adapt them well for use as a gas filtering medium.

To avoid uneven matting down with use and the creation of open channels with no filtering effect the strands may be cemented together by means of an adhesive to fix their mutual relation substantially permanently. While the breakage of metallic strands and passage of such fragments into the motor may result in serious abrasion and scoring of moving parts, passage of wood fragments thereinto produces no such ill effects since the latter are merely consumed by the hot gases.

In carrying out my invention, I find it advantageous to use porous species of woods, such as elm, ash, cypress, basswood, poplar, etc. With some species, such as ash, cypress, basswood, etc., the surfaces of the strands are rougher and have a greater proportion of torn and jagged fragments or fibers projecting therefrom, than with other species. For the purpose of minimizing the weight of the filtering mass the less dense species may be used. Since density varies inversely with porosity, the more porous woods are also the lighter woods.

Figure 1:
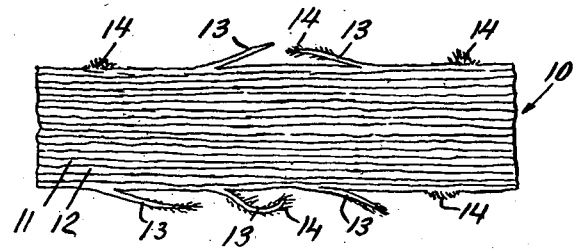
Fig. 1 is an enlarged side view of a fragment of a wood strand especially suitable for use in my improved filtering medium.
Figure 2:
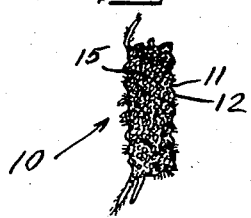
Fig. 2 is an enlarged end view of the strand shown in Fig. 1.
Figure 3:
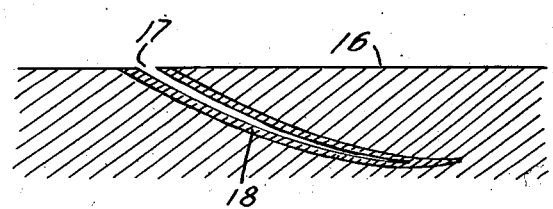
Fig. 3 is a detail view showing the way in which the cavity of a wood fiber is exposed in the surface of a wood strand.

The strand 10 shown in Figs. 1 and 2 is formed from basswood and exhibits the rough and jagged surfaces produced by the process of its formation. Series of grooves 11 and ridges 12 are produced in the strand, similar, on a smaller scale, to those seen upon the surfaces of wood that has been split with an axe. At numerous places along the length of strand 10 portions 13 of the wood are torn loose and project from the surface. A projection 13 may be a single wood fiber or a bundle or fibers. Upon the surfaces of some of the projections 13, and also at points upon the surface of the strand, there are fringes 14 of gauze-like character, composed of minute hairlike particles of wood of microscopic size. Projections 13 and fringes 14 are important factors in my invention. Fig. 2 shows the open pores 15 which may be the cell-cavities of individual wood fibers or the continuous sap-conducting vessels which extend longitudinally of the strand. The cutting operation exposes the longitudinal sections of some of the pores, which appear under the microscope in the form of elongated deep fissures. While the cutting knife moves substantially parallel to the grain of the wood, it does not follow the grain exactly with the result that a proportion of the fibers are severed transversely, exposing the open pores upon the surface of the strand. This is illustrated in Fig. 3 wherein 16 represents the surface of the strand, 18 an individual fiber and 17 the exposed cavity. The diagonal lines surrounding the fiber 18 represent the other fibers which go to make up the strand. Others are exposed by the rupturing of the fibers caused by the tearing action described heretofore. The strand does not have an epidermis and is preferred over other organic materials for that reason, since an epidermis seals over the pores and provides a more or less smooth surface. In fact, the surface roughness of the wood strands may be enhanced by subjecting them to a mechanical rubbing operation. This is more effective if the strands are soaked in water prior to or during the operation after which they may be dried again. The roughness may also be increased by treating the strands with a solution of a caustic alkali.

The strands are preferably ribbon-like, that is, their transverse shape is such that one side is thin with respect to the other. Fig. 2 illustrates the flattened transverse shape. The preferred transverse dimensions are, thickness, about 0.005 to 0.015, width, about 0.020 to 0.050 inch. The length should not be less than one-half inch, and should preferably be more than three inches.

To form the filtering medium, a mass of the strands is packed or wadded together in heterogeneous manner, care being taken that the density of packing is maintained substantially uniform throughout. There is thus provided a system of uniformly distributed, intercommunicating voids. The mass may be maintained in its form by a frame, as will be described hereinafter. A treatment with a viscous substance, such as oil, may be applied thereto. The mass of wood strands, either with or without the viscous coating, successfully resists any heat or fire which may be caused by back-firing of the engine. As stated heretofore, an adhesive may be applied to the strands to prevent uneven matting down of the mass with use. This may be done before or after the mass is formed; by immersing the strands in the adhesive or by spraying the adhesive upon them. If the strands are immersed in the adhesive the proportion of adhesive may be regulated by centrifuging the excess off of the strands.

A wide variety of adhesives may be used, such a casein glue, blood albumen glue, starch glue, etc., but it is preferred to use an adhesive having, as a base, an alkali silicate such as sodium silicate. An aqueous solution containing about 40% solids is used.

Sufficient adhesive is applied to the strands to bind them together in fixed form and relation. About three to six parts by weight of silicate solution is used to one part of wood. After the binder has dried there are approximately 1¼ to 2½ parts of binder present to one part of wood, but due to the much greater density of the binder, the volume proportion of the latter is comparatively small. It binds the strands together where they join and forms only a thin and discontinuous coating upon the rest of the strands' surfaces. The surface roughness of the strands is not materially affected by the presence of the adhesive. The adhesive itself dries with an irregular surface. The strands are stiffened somewhat by the adhesive.

After the filtering unit has been formed either with or without an adhesive, a viscous substance, such as oil, is sprayed thereon or the unit is immersed in a bath of the viscous substance until the strands are thoroughly impregnated and a permanent coating is formed. The excess is allowed to drain off.

Any of the ordinary viscous substances which are commonly used for coating filtering masses may be used. Suitable substances are automobile lubricating oil, paraffin, lard oil, castor oil, petrolatum, glycerin and wax. Petrolatum, paraffin, wax and other normally solid or near-solid, substances should be heated to reduce their viscosity and the filtering mass may be immersed therein. Upon cooling a tacky coating remains which is quite suitable for the purpose. The oil carrying capacity of the strands of this invention is considerably greater than that of materials which have been used heretofore, such as steel wool and crimped copper strands under similar conditions of voids proportion or air retriction. With a preferred type of strand, that is, a basswood strand about 0.012 by 0.040 inch in transverse section, and automobile lubricating oil, the wood carries somewhat more than its own weight of oil. In specific examples, using strands of the above transverse dimensions, copper strands aggregating 1317 lineal feet in length (weight 183 grams) carried 34.7 grams of oil, or about .026 gram per lineal foot while wood strands aggregating 1102 lineal feet in length (weight 28.08 grams) carried 41.92 grams of oil, or about .038 gram per lineal foot. Wood strands, therefore, carry about fifty percent more oil than do metal strands of the same dimensions.

As stated heretofore, the filtering mass of this invention possesses desirable properties. A primary advantage is the provision of prolonged high filtering efficiency. The substantially flat sides of the different strands are practically all disposed in different planes so that each imparts a different component of direction to the passing gas or air. The combination of this characteristic and the roughness of the strands' surfaces result in the air or gas being subjected to a thorough mechanical scrubbing as it passes through the mass. In addition, the continued deflection of the gas sets up eddy currents and the dust and dirt settle out more readily under such conditions. The high oil-carrying capacity is due to the increased adherence caused by the surface roughness and porosity of the strands and the presence of projections 13 and hairlike particles 14. The increased adherence creates a resistance to the action of the air or gas stream in carrying away the oil with use with the result that the oil retention is also high.

In addition, there is actual absorption of oil into the wood because numerous cell cavities 15 are exposed in its surface and the oil has the property of penetrating into them. As stated heretofore, the adhesive forms only a discontinuous coating upon the strands, leaving a considerable proportion of their surfaces exposed. The oil follows the pores and permeates the wood completely. The cells become impregnated and act as reservoirs for the replenishment of oil at the surface as the latter becomes depleted. As the oil is carried away by the air or is taken up and absorbed by the dust and dirt which is entrapped by it at least part of the oil within the cells migrates to the surfaces by capillary action. Some sort of equilibrium is apparently maintained between the quantity of absorbed oil and the quantity of oil carried upon the surface. As a result, an adequate coating of oil is maintained for prolonged periods upon the strands. The oil carrying and retaining powers of the strands are not materially affected by the presence of the adhesive. Because of the characteristics described high initial filtering efficiency is obtained and is maintained over long periods of use. Such characteristics are lacking in the non-porous, smooth-surfaced and/or round strands used heretofore and as a result, for comparable air-restriction conditions, their initial filtering efficiency is less and the efficiency decreases more rapidly with use.

Filtering efficiency, in addition to being dependent upon the physical character of the filtering mass, is proportional to the flow restriction offered per unit volume (or inversely proportional to the void space per unit volume) and to the size of the filter. In the case of automobile air cleaners, space requirements usually determine their size and it is frequently necessary to provide efficiency by increasing the flow restriction or density. This, however, may not exceed an allowable maximum, or excessive restriction will be experienced. In order to meet specific conditions and still maintain uniform high efficiency, my filtering mass may be packed so as to weigh from 1½ to 8 pounds per cubic foot, based upon the weight of the wood strands alone. With the oil coating the weight of the mass is approximately 3 to 20 pounds per cubic foot and if it is bonded together by a sodium silicate adhesive the weight is about 4 to 36 pounds per cubic foot. The preferred densities are approximately 2 to 5 pounds per cubic foot for the wood strands alone, 4 to 12 pounds for strands with an oil coating and 7 to 22 pounds for adhesive-bonded strands with an oil coating. These densities conform to a void proportion of from 67 to 94% for the contemplated range and from about 80 to 92% for the preferred range, based upon the presence of the wood strands alone. With the adhesive and oil present, the contemplated range is about 45 to 90% voids and the preferred range is about 65 to 87% voids. These figures are based upon basswood strands and the use of different species of wood of course, results in slightly different figures. Such flexibility with respect to density of packing makes it possible to predetermine the optimum void size and obtain substantially uniform effectiveness under varying size limitations.

Figure 4:
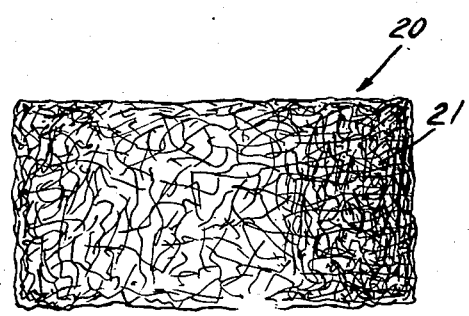
Fig. 4 is a side view of one form of a filtering unit comprising a formed mass of the strands illustrated in Figs. 1 and 2.
Figure 5:
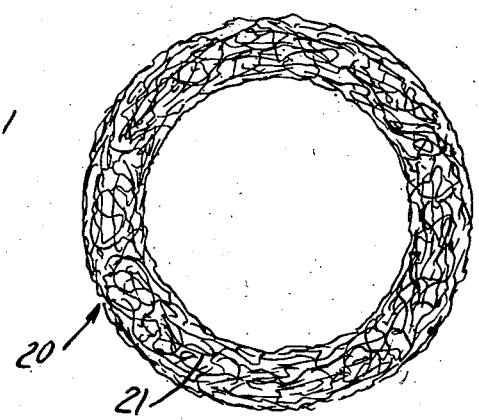
Fig. 5 is a top view of the unit shown in Fig. 4.

Figs. 4 and 5 show a cylindrical filtering unit 26 in which the strands 21 are packed together into an intertangled mass which may be maintained in fixed relation by means of the adhesive. As stated heretofore, the major transverse dimension of each strand is disposed differently from that of practically every other strand and because of this heterogeneous arrangement the flat surfaces of each strand deflect the oncoming air stream in a different direction. The air is thus brought into frictional contact with a maximum surface area of the oil treated strands and is subjected to a thorough mechanical scrubbing action.

Figure 6:
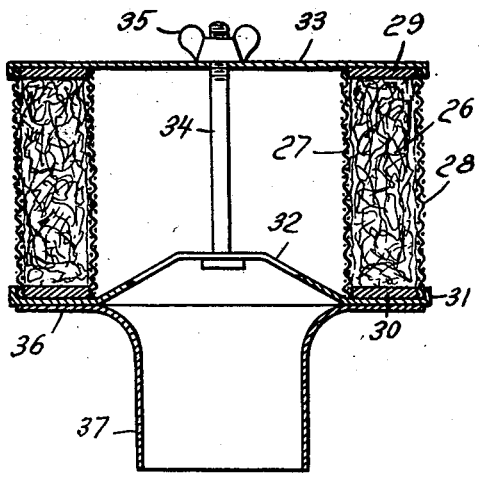
Fig. 6 is a vertical sectional view of a similar filtering unit in which the mass is retained within a frame which is mounted in an air cleaner body.
Figure 7:
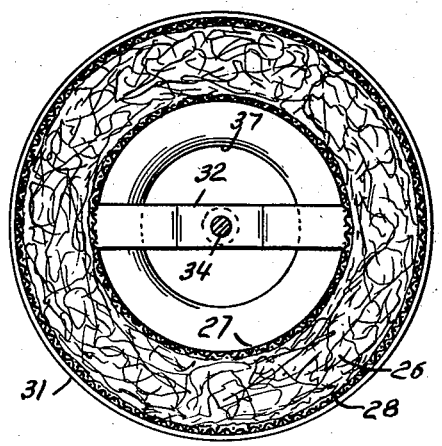
Fig. 7 is a horizontal sectional view of the unit shown in Fig. 6.

In the construction shown in Figs. 6 and 7 the formed mass of filtering material 26 is placed between concentric cylindrical wire mesh facing members 27 and 28. The facings may also be of perforated metal or other suitable foraminous material. The top and bottom of the mass are covered by discs 29 and 30 respectively of covering material, such as metal, suitably fireproofed paper, asbestos paper, asbestos cement, etc., which may be united to the mass by means of an adhesive.

The unit comprising mass 26, screen facings 27 and 28, and covering sheets 29 and 30 may be mounted in an air cleaner body as shown in Figs. 6 and 7. The bottom of the unit rests upon annular retaining member 31 which has bracket 32 extending diametrically between and connecting two opposite sides thereof. A circular plate 33 is fitted over the top of the filtering unit and clamped to a bracket 32 by means of a bolt 34 and a wing nut 35. An annular member 36 is connected to the bottom side of retaining member 31, as by spot-welding. This member curves downwardly into the form of a cylindrical outlet 37 which is adapted to be connected to the intake of a carburetor. The inspired air is drawn radially through the filtering unit and discharged axially through outlet 37.

The filtering unit shown in Figs. 4 and 5 is adapted to be installed in a cleaner body similar to that shown in Figs. 6 and 7.

Figure 8:
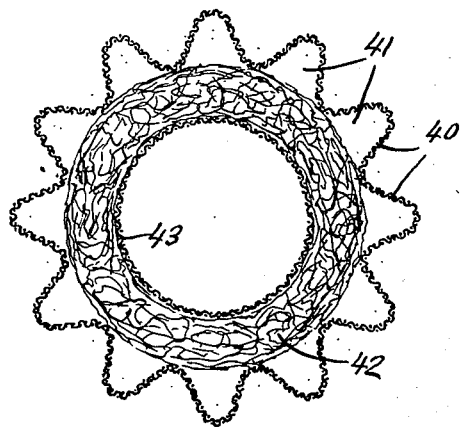
Figs. 8 and 9 are horizontal sectional views of modifications of the unit shown in Figs. 6 and 7.

Fig. 8 shows a modification of the cleaner unit in which the exterior screen facing 40 is sinuated forming spaces or air pockets 41 between it and the exterior surface of the filtering mass 42. The usual interior screen facing 43 is provided. Spaces 41 serve to hold quantities of dust and dirt, and permit more uniform distribution of the passing air over the exterior area of filtering mass 42. This arrangement also decreases the restriction offered by the exterior screen facing.

Figure 9:
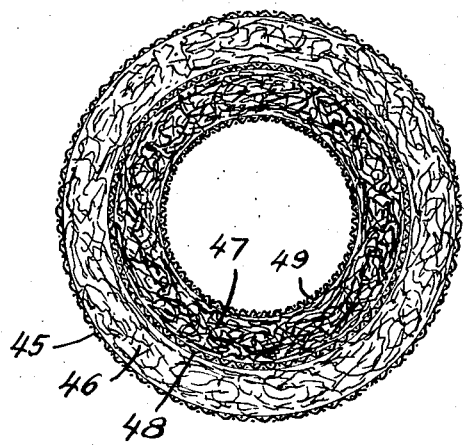

Fig. 9 shows an arrangement which possesses advantages in most application and particularly under conditions where coarse dust and dirt particles are encountered. The filtering mass is in two sections, one arranged externally of the other, and being of lesser density. External screen facing 45 may be of relatively coarse mesh. Annular section 46 of filtering mass is arranged within screen facing 45 and is of relatively less density. For example, section 46 may have a weight of 2 pounds per cubic foot, based upon the weight of the wood strands alone. Intermediate partition 47 of wire mesh of somewhat closer mesh than that of facing 45 is arranged within filtering mass 46. Arranged interiorly of partition 47 is a section 48 of filtering mass which is of somewhat greater density than that of section 46. For example, the wood strands in section 48 may be packed to a weight of 2½ pounds per cubic foot. An interior screen facing 49 is provided which may be of somewhat smaller mesh than is partition 47.

In this arrangement the incoming air meets the less dense filtering mass first and has the larger particles of solids removed in the larger interstices of section 46. The particles are distributed substantially uniformly throughout the volume of the section. The smaller particles are removed by section 48 and are likewise distributed substantially uniformly throughout the volume of the section. In this manner all parts of the filtering mass are utilized in the dirt and dust removal operation and the maximum service is obtained. If a filtering mass is used which is too dense for the character of solids in the air, the large particles are removed at the external surface of the mass, the interstices become choked, and the flow resistance becomes excessive. Under such conditions the air stream may also form enlarged channels through the mass which have no filtering effect, with the result that there is practically no filtering function.

The invention is not limited to the annular type units described and illustrated heretofore, but may be employed in units of flat and all other shapes. It may be used in connection with ventilators or in any other installation, domestic, commercial or industrial, where air or gas filtration is desired. Where large areas of filtering mass are presented to the air stream, the thickness may be whatever is desired but in automobile air cleaners, where the filtering area must necessarily be limited, it is preferred not to reduce the thickness to less than one inch.

The removal and replacement of filtering units is very simply accomplished by unscrewing wing nut 35 and removing top plate 33, after which the filtering unit may be removed and replaced freely. The inexpensive character of my improved filtering unit is such that the motorist is quite likely to dispose of it when it has become used and dirty and replace it with a new one rather than to go to the trouble of cleaning and re-oiling it. In this way it is proposed to provide a market for units of this character such that they may be sold at filling stations, where the used unit will be removed and the new one installed without any effort or trouble upon the part of the motorist.

However, the treated wood strands possess sufficient strength to withstand continued use and units that have become dirty with use may be cleaned and re-oiled and re-used repeatedly. If fragments of fiber occasionally break off and pass into the engine, the wood merely burns and is consumed and the quantity of adhesive, which remains as a fine powder, is insignificant. If an organic glue is used, it is consumed, also.

I claim:

1. A gas filtering body comprising a shaped mass of intertangled, elongated wood strands, said strands being angular in transverse section and having highly porous, irregular surfaces with a substantial amount of jagged portions and hairlike fringes of body material projecting therefrom, said strands being bonded together in substantially fixed form and relation by an adhesive, said adhesive forming discontinuous coatings upon said strands.

2. A gas filtering body comprising a shaped mass of intertangled, elongated wood strands, said strands being angular in transverse section and having highly porous, irregular surfaces with a substantial amount of jagged portions and hairlike fringes of body material projecting therefrom, said strands being bonded together in substantially fixed form and relation by an adhesive, said adhesive forming discontinuous coatings upon said strands, said strands being impregnated and coated with a viscous substance.

3. A gas filtering body comprising a shaped mass of intertangled, elongated wood strands, said strands being angular in transverse section and having highly porous, irregular surfaces with a substantial amount of jagged portions and hairlike fringes of body material projecting therefrom, said strands being bonded together in substantially fixed form and relation by an adhesive comprising sodium silicate, said adhesive forming discontinuous coatings upon said strands.

4. A filtering body for removing solids from a gas stream comprising a shaped mass of intertangled, elongated strands of highly porous wood, said strands being of substantially predetermined shape and dimensions and having rough, porous surfaces, said strands being bonded together in substantially fixed form and relation by an adhesive, said adhesive forming incomplete coatings upon said strands, said strands being impregnated and coated with a viscous substance.

5. A gas filtering body comprising a shaped mass of intertangled, elongated wood strands, said strands being angular in transverse section and having highly porous, irregular surfaces with a substantial amount of jagged portions and hairlike fringes of body material projecting therefrom, said strands being bonded together in substantially fixed form and relation by an adhesive, said adhesive forming discontinuous coatings upon said strands, said mass weighing approximately 7 to 22 pounds per cubic foot.

6. A filtering body for removing solids from a gas stream comprising a shaped mass of intertangled elongated strands, said strands being angular in transverse section and having highly porous, irregular surfaces with a substantial amount of jagged portions and hairlike fringes of the body material projecting therefrom, said strands being bonded together in substantially fixed form and relation by an adhesive, said adhesive forming incomplete coatings upon said strands, said strands being impregnated and coated with a viscous substance, said body being encased in a foraminous supporting frame and having its short dimension aligned with the path of the gas stream.

7. A gas filtering body comprising a mass of intertangled, elongated wood strands, said strands being bonded together in substantially fixed form and relation by an adhesive, said adhesive forming discontinuous coatings upon said strands.

8. An air cleaner for internal combustion engines comprising a frame having radial inlet and axial outlet, a shaped body of filtering material in said frame, said material comprising a mass of intertangled, elongated wood strands, said strands being bonded together in substantially fixed form and relation by an adhesive said adhesive forming discontinuous coatings upon said strands.

HOWARD F. WEISS.